Sept. 13, 1960    G. E. SERNIUK ET AL    2,952,291
PNEUMATIC TIRE
Filed Dec. 30, 1957    2 Sheets-Sheet 1

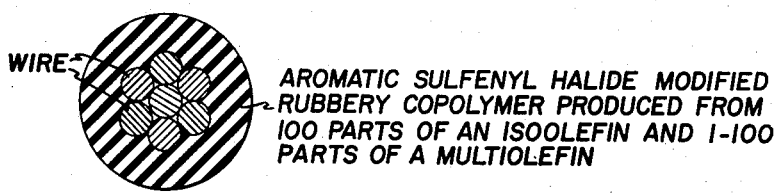

AROMATIC SULFENYL HALIDE MODIFIED RUBBERY COPOLYMER PRODUCED FROM 100 PARTS OF AN ISOOLEFIN AND 1-100 PARTS OF A MULTIOLEFIN

WIRE

FIG. I

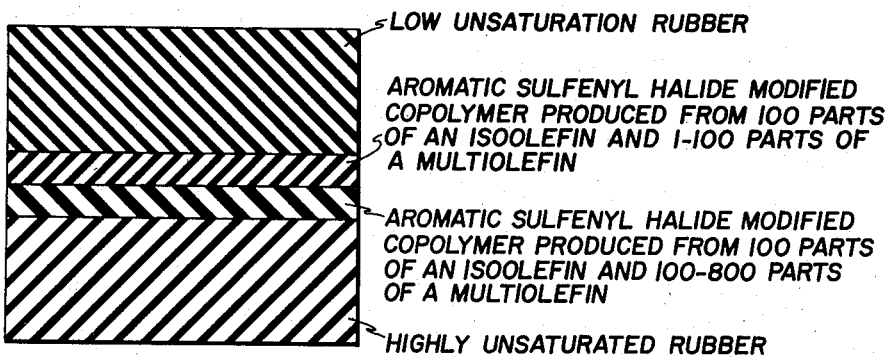

LOW UNSATURATION RUBBER

AROMATIC SULFENYL HALIDE MODIFIED COPOLYMER PRODUCED FROM 100 PARTS OF AN ISOOLEFIN AND 1-100 PARTS OF A MULTIOLEFIN

AROMATIC SULFENYL HALIDE MODIFIED COPOLYMER PRODUCED FROM 100 PARTS OF AN ISOOLEFIN AND 100-800 PARTS OF A MULTIOLEFIN

HIGHLY UNSATURATED RUBBER

FIG. II

George E. Serniuk
Francis P. Baldwin    Inventors

By  W. N. Smyers  Attorney

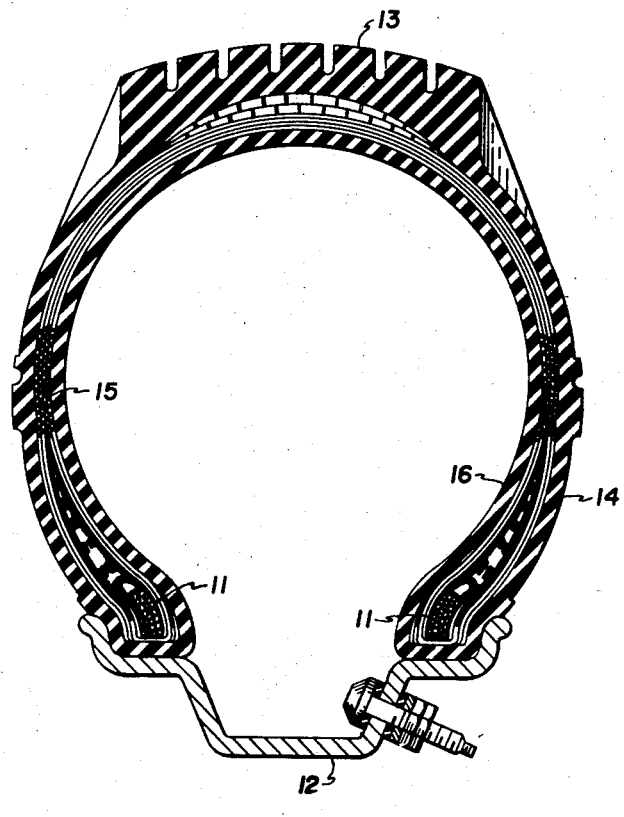
FIG. III
George E. Serniuk
Francis P. Baldwin    Inventors
By W. H. Smyers    Attorney

United States Patent Office 2,952,291
Patented Sept. 13, 1960

2,952,291

PNEUMATIC TIRE

George E. Serniuk, Roselle, and Francis P. Baldwin, Colonia, N.J., assignors to Esso Research and Engineering Company, a corporation of Delaware Filed Dec. 30, 1957, Ser. No. 706,206

19 Claims. (Cl. 152—330)

This invention relates to novel rubber reaction products and methods of preparing and using the same. More particularly, the present invention relates to the reaction of isoolefin-multiolefin copolymers, particularly butyl rubber with minor proportions of selenenyl or particularly sulfenyl halides.

This application is a continuation-in-part of Serial No. 597,989, filed July 16, 1956, now abandoned.

Butyl rubber which comprises the low unsaturation copolymerization product of a major proportion of an isoolefin and a minor proportion of a multiolefin has been available commercially for a number of years and has found utility in the manufacture of certain products such as automobile inner tubes, electrical insulation, tire curing bags or bladders and the like. In many respects, butyl rubber is superior to natural rubber or any of the high unsaturation synthetic rubbers such as diene-styrene rubbers, diene-nitrile rubbers, polychloroprene rubber, etc. which have unsaturations in the order of about 300 to 400 iodine number (Wijs). This is because the low unsaturation of butyl rubber renders the product, both before and after vulcanization, more resistant to oxidation and attack by chemical agents than the above-mentioned highly unsaturated rubbery materials.

However, butyl rubber, due to its low unsaturation, has heretofore shown a relatively low degree of reinforcement or interaction with commonly used fillers such as carbon black, silica clays, etc. in comparison to the high unsaturation rubbers. This failure to completely disperse with fillers, as exemplified by relatively low resistivity values for compounded stocks containing fillers, especially carbon blacks, has somewhat restricted the amount of fillers commonly incorporated into butyl rubber blends to be vulcanized. Also, although the ozone resistance of butyl rubber is much greater than that of the highly unsaturated rubbers, since only smaller amounts of fillers could be employed in conjunction with butyl rubber, electrical insulation made from butyl rubber has been somewhat more expensive than insulation made from more highly unsaturated rubbers extended with large amounts of fillers. It is therefore very desirable to have available an isoolefin-multiolefin rubbery copolymer, particularly a butyl-type rubber which, when compounded with fillers, has a high resistivity value and which may therefore also tolerate the addition of relatively large amounts of fillers thereto.

Also, in the production of tires it is desirable for certain layers therein and especially for those layers exterior to the carcass to have a combination of both high tensile strength and a high modulus. Furthermore, the vulcanizate formed of an isoolefin-multiolefin containing rubbery copolymer, particularly butyl rubber, should not be tacky and should have good recovery after creasing. It is also desirable to have available an isoolefin-multiolefin containing rubbery copolymer, particularly butyl rubber which is, because of its low unsaturation, unreactive to chemicals and resistant to oxidation, but also is very adhesive to metal. This last mentioned combination of characteristics is particularly desirable in the production of rubber wire insulation, rubber tires, tire bead rubber insulation, rubber shock mounts, etc.

The present invention overcomes the above mentioned disadvantages and makes available rubbery materials of high resistivity and excellent adhesion to metal and to rubbery polymers (such as copolymers and homopolymers) which, upon vulcanization, exhibit a combination of both high tensile strength and high modulus as will be apparent from the following description wherein reference will be made to the drawings in which:

Figures I and II are sectional views of structures illustrating in a self-explanatory manner, practical applications of the invention, facilitating an understanding thereof; and Figure III is a vertical section of a pneumatic tubeless tire employing therein a modified rubbery copolymer in accordance with the invention.

According to the present invention, it has now been discovered that isoolefin-multiolefin copolymers, particularly butyl rubber, can be improved as to resistivity, modulus, rebound, adhesion to metal and to other rubbery polymers, and lack of tack of the final vulcanizate by reacting the rubbery copolymer with a minor proportion of a non-metallic halide which is either a sulfenyl halide and/or a selenenyl halide. While the sulfenyl or selenenyl halides may contain $C_1$ to $C_{20}$ aliphatic, $C_3$ to $C_{30}$ naphthenic (or cycloparaffinic), $C_1$ to $C_{25}$ heterocyclic, and/or other groups, the preferred compounds are the aromatic derivatives having the general formula:

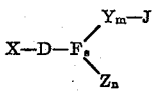

in which X is halogen (preferably chlorine or bromine); D is sulfur or selenium, F is a $C_6$ to $C_{30}$, preferably a $C_6$ to $C_{24}$, mono or polynuclear aromatic nucleus such as phenyl, diphenyl, naphthyl, anthracyl, etc., with or without up to about 5 inert $C_1$ to $C_{18}$, preferably $C_1$ to $C_{12}$ alkyl substituents. Examples of such nuclei being tolyl; 1,3-dimethyl naphthyl; diphenyl $C_1$ to $C_5$ alkanes such as 1,1-diphenyl $C_1$ to $C_5$ alkanes or a diphenyl nucleus of the general structure

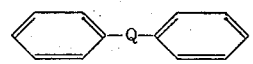

wherein Q is selected from the group consisting of

—NH—, —NHCO—, —NHCONH—,
—SO$_2$—, —S—, —S—, —O—, —C—, —C—,
          ∥               ∥   ∥
          O               S   O

—P:P—, —P=N—, —N=NCONH—, and —N=N—

Y is alkyl, aralkyl, alkaryl, or cycloalkyl; m being 0 to 10 and denoting between about 0 to 10, preferably 1 to 6 carbon atoms; J being selected from the following groups;

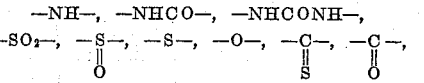

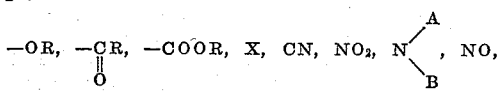

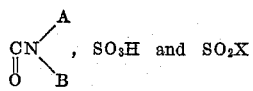

in which R is hydrogen or a monovalent $C_1$ to $C_{20}$ hydrocarbon radical (e.g. alkyl, aryl, aralkyl, alkaryl, or cycloalkyl); X being halogen; A or B being R (as above), NO, RNO, OR, ROR, X, RX, CN, RCN, NO$_2$, RNO$_2$, SO$_3$H, RSO$_3$H, SO$_2$X, RSO$_2$X, N=R, RN=NR, N=NOR, N=NCOOR, RN=NCOOR, N=N—NR$_2$ or RN=N—NR$_2$. Several different substituents (Y) may be present in the same sulfenyl halide or selenenyl halide compound; and Z may be X, —OH, —SO$_2$H, —SO$_3$H, —$NH_2$, —$SOX$, $SO_2X$, —$NHX$, —$NX_2$, —$NO$, —$NO_2$, —$NHSO_2OH$, —$NH$—$NR_2$ and —$NH.NH.NO_2$; $n$ being an integer between about 0 to 4, preferably between about 1 to 3. Suitable aliphatic, naphthenic, heterocyclic or especially aromatic sulfenyl or selenenyl halides useful for the purposes of the present invention include, among others, the following: benzenesulfenyl chloride, benzenesulfenyl bromide, nitrobenzenesulfenyl chlorides, nitrosobenzenesulfenyl bromides, dinitrosobenzenesulfenyl chlorides or bromides; dinitrosoarylsulfenyl halides; 2,4-dinitrobenzenesulfenyl chloride; chloronitroarylsulfenyl halides; chloronitroso arylsulfenyl halides; bromonitroso arylsulfenyl bromides; bromonitroso arylsulfenyl chlorides; chloronitroso arylsulfenyl bromides; chloronitroso arylsulfenyl chlorides; 2,4-dinitrosobenzene sulfenyl chloride or bromide; 2,4-dinitrobenzenesulfenyl chloride or bromide; 4-chloro-2-nitrobenzenesulfenyl chloride or bromide; 4-bromo-2-nitrobenzenesulfenyl chloride or bromide; 2,5-dibromobenzenesulfenyl bromide or chloride; 4-chlorosulfonebenzenesulfenyl chloride or bromide; o-nitrobenzeneselenenyl chloride or bromide; 2,4-dinitrobenzeneselenenyl chloride or bromide; o-nitroanthracene selenenyl bromide or chloride; 2,5-dichloro-3-methyl-6-hydroxybenzenesulfenyl chloride; 2-hydroxy-5-methylbenzenesulfenyl bromide or chloride; p-acetamidobenzenesulfenyl bromide or chloride; 2-carboxybenzenesulfenyl chloride or bromide; 4-carboxybenzenesulfenyl chloride or bromide; 2-nitro-4-carboxybenzenesulfenyl chloride; 3-carboxybenzenesulfenyl chloride or bromide; 4-methyl-2-nitrobenzenesulfenyl chloride; biphenylsulfenyl chloride or bromide; nitrobiphenylsulfenyl chlorides or bromides; chlorobiphenylsulfenyl chloride; chlorosulfonebiphenylsulfenyl chloride; 4-acetamido-1-naphthalenesulfenyl chloride or bromide; 4-acetamido-1-anthracene sulfenyl bromide or chloride; 4-amino-1-anthraquinone-sulfenyl bromide or chloride; 4-hydroxy-1-anthraquinonesulfenyl chloride or bromide; 1-anthraquinonesulfenyl chloride or bromide; 2-anthraquinonesulfenyl chloride or bromide; benzothiazolesulfenyl chloride or bromide; and triphenylmethanesulfenyl chloride or bromide, methylsulfenyl chloride; alpha chloromethylsulfenyl chloride; ethylsulfenyl chloride; alpha chloroethylsulfenyl chloride; normal or isopropyl sulfenyl chloride; tertiary butylsulfenyl chloride; cyclopentylsulfenyl chloride; cyclohexylsulfenyl chloride; thiacyclopentanesulfenyl chloride; thiacyclohexanesulfenyl chloride; thiazoline-2-sulfenyl chloride, etc. The non-aromatic compounds may contain groups like those set forth for "J" above, an especially effective substance being alpha haloalkyl sulfenyl halides, e.g. alpha chloroethyl sulfenyl chloride, chloromethyl sulfenyl chloride, etc.

In practicing the present invention, an isoolefin-multiolefin copolmer such as butyl rubber or the like is reacted with one or more of the foregoing types of sulfenyl or selenenyl halides (preferably aromatic sulfenyl halides), at a temperature between about 10° C. and 175° C., preferably between about 25° C. and 80° C. for a time between about 1 minute and 24 hours, preferably between about 0.1 and 6.0 hours so as to contain therein about 0.1 to 1.0 mole of combined sulfenyl or selenenyl halide per mole of double bonds in the original butyl rubber polymer. In other words, the butyl rubber polymer advantageously contains between about "0.1X" to "X" (preferably between about "0.2X" to "0.6X") weight percent of the sulfenyl or selenenyl halide compound wherein:

$$X = \frac{U(L)}{(100 - LM_1 + L(M_2 + U)} \times 100$$

and:

$L$ = mole percent of the multiolefin in the copolmer,
$M_1$ = molecular weight of the isoolefin,
$M_2$ = molecular weight of the multiolefin, and
$U$ = molecular weight of the aromatic sulfenyl halide or selenenyl halide.

In one embodiment of the invention, the rubbery copolymer is preferably dissolved in a substantially inert solvent such as hexane, cyclohexane, benzene, chloroform or carbon tetrachloride, the sulfenyl and/or selenenyl halide being then added to the resulting solution. Reaction is then allowed to ensue at temperatures between about —30° and +130° C., advantageously between about 20° and 120° C., preferably between about 30° and 80° C., for between about 15 minutes to about 24 hours or more. The product formed may be recovered from the reaction mixture by flashing off the inert solvent or alternatively by a multiple solution-precipitation technique using such materials as chloroform, benzene, cyclohexane or carbon tetrachloride as the solvent; acetone, methyl alcohol, isopropyl alcohol or dioxane being suitable anti-solvents. Residual solvents are then advantageously removed by heating, preferably under about 0.02 to 30 p.s.i.a. (and even more especially under about 0.05 to 15.0 p.s.i.a.) for about 0.5 to 16 hours at temperatures of about 50° to 150° C.

In compounding the sulfenyl halide and/or selenenyl halide-modified rubbery copolymer for vulcanization, it is preferred to pre-mix the modified polymer, mold release agent (such as stearic acid), antioxidant and filler, which mixture is advantageously hot milled, prior to vulcanization, for about 0.5 to 100 minutes, advantageously from about 3 to 30 minutes, preferably for about 5 to 10 minutes at temperatures of about 250° to 400° F., advantageously about 275° to 350° F., preferably about 300° to 320° or 330° F. prior to adding the curatives. To about 100 parts by weight of the hot milled stock may then be added about 0.5 to 50, advantageously about 1 to 40, preferably about 2 to 30 parts by weight of a bivalent metal oxide (preferably zinc oxide), about 0.3 to 10.0, preferably about 0.5 to 5.0 parts by weight sulfur and about 0.2 to 5.0, preferably about 0.3 to 3.0 parts by weight of an ultra accelerator such as a tetraalkyl thiuram sulfide or especially a tellurium dialkyl dithiocarbamate. Alternatively, the sulfenyl halide or selenenyl halide-modified butyl rubber may be blended directly with the filler and mold release agent such as stearic acid in a Banbury or on an open or closed mill followed by addition of the curatives in any conventional manner. The mixture may then be put through forming operations such as tubing, calendering and cement preparation, etc, preparatory to vulcanization.

Vulcanization of the foregoing compositions, according to the present invention, is advantageously for about 10 seconds to about 5 hours (e.g. 10 minutes to 3 hours) at about 250° to 350° F., or for about 0.1 to 10 minutes at about 350° to 450° F. The higher the vulcanization temperature, the shorter may be the vulcanizing time and vice versa. The optimum vulcanization conditions appear to be for about 1 to 200 minutes at about 270° to 375° F., preferably at about 285° to 350° F. Insofar as the degree of fineness of the sulfur is concerned, the sulfur may pass through a 50 mesh to about a 500 mesh screen. However, a fineness of about 200 to 350 mesh or finer appears to be preferable for the purposes of the invention. Vulcanization of sulfenyl and/or selenenyl halide-modified isoolefin-multiolefin copolymers in accordance with the invention may also be performed under the above general conditions by means of polyvalent metal oxides such as zinc oxide in either the presence or absence of elemental sulfur. Other curing agents which may be likewise used alone or in conjunction with elemental sulfur include quinoid compounds or derivatives such as p-quinone dioxime and/or p-quinone dioxime dibenzoate and/or p-dinitrosobenzene, dinitrosobenzaldehydes; polyamines such as phenylene diamine, diorthotolyl guanidine, phenol dialcohol resins of the polymethylol phenol type, diphenyl guanidine, glycols, diisocyanates, diisothiocyanates, etc.

Butyl rubber, or GR–I rubber (Government Rubber-Isobutylene) as referred to herein and in the prior art, comprises the copolymerization product of a major proportion of a $C_4$ to $C_8$ isoolefin and a minor proportion of a $C_4$ to $C_{14}$ multiolefin. Copolymers of the above general type, especially where the copolymer is of about 85 to 99.5% isobutylene, 2-methyl-1-butene, or 3-methyl-1-butene with about 0.5 to 15% of a $C_4$ to $C_8$ or $C_{10}$ conjugated diolefin such as isoprene, butadiene, piperylene, dimethylbutadiene, cyclopentadiene, cyclohexadiene, or such multiolefins as dimethallyl, mycrene, allo-ocymene, etc., are commonly referred to in patents and literature as "butyl rubber," e.g. textbook "Synthetic Rubber" by G. S. Whitby. The preparation of butyl type rubbers is described, for example, in U.S. Patent 2,356,128 to Thomas et al.

In preparing butyl rubber, a low molecular weight isoolefin such as 2-methyl-1-butene or preferably isobutylene, is copolymerized preferably with a conjugated diolefin, especially isoprene, at relatively low temperatures; generally from about 0° C. to about —200° C. or lower; an advantageous range being from about —40° C. to about —180° C., preferably from about —80° C. to —150° C. The copolymerization is conducted in the presence of a Friedel-Crafts catalyst such as aluminum chloride, titanium tetrachloride, boron trifluoride, uranium chloride, aluminum ethoxy-chloride, etc. preferably and in some cases necessarily dissolved in an alkyl halide (having about 1 to 3 carbon atoms) such as ethyl or methyl chloride, or dissolved in carbon disulfide or an equivalent solvent.

One particularly advantageous butyl rubber is produced with the preferred reactants being about 0.5 to 5.0 parts by weight of isoprene and about 95.0 to 99.5 parts by weight of isobutylene. The mixture of these reactants is cooled to a temperature within the range of about —50° C. to —150° C. and then polymerized by the addition thereto of a catalyst solution of an aluminum halide, such as aluminum chloride dissolved in methyl chloride. The resulting copolymer preferably has a Staudinger molecular weight between about 20,000 and 200,000 and even more especially between about 30,000 and 150,000. When so prepared, the material is rubbery in nature and has the property of being curable with sulfur especially in the presence of organic sulfides, particularly of the alkyl thiuram sulfide or thiocarbamate types.

Other suitable isoolefin-multiolefin copolymers, other than butyl rubber, which are advantageously chemically modified in accordance with the present invention by reaction with sulfenyl halides and/or selenenyl halides comprise copolymers prepared from feeds composed of about 50 to 100 parts by weight of a $C_4$ to $C_{14}$ multiolefin such as a $C_4$ to $C_{10}$ conjugated diolefin with about 100 parts by weight of a $C_4$ to $C_8$ isoolefin such as isobutylene or 2-methyl-1-butene. Such copolymers have iodine numbers between about 30 and 200 (Wijs). Still another class of isoolefin-multiolefin copolymers comprises copolymerization products formed from feeds comprising about 100 to 800 parts by weight of a $C_4$ to $C_{14}$ multiolefin with about 100 parts by weight of a $C_4$ to $C_8$ isoolefin. These copolymers generally have iodine numbers between about 50 and 300, preferably between about 80 and 230 (Wijs).

It is also within the purview of the present invention to chemically modify with the sulfenyl halides and/or selenenyl halides, tripolymers of isoolefins, multiolefins and monoolefinic compounds containing an aromatic nucleus such as styrene, alpha methyl styrene, p-methyl styrene, indene, dihydronaphthalene, p-chlorostyrene, dichlorostyrene, mixtures thereof, etc. The amount of the monoolefinic aromatic compound is employed in a minor proportion based on total reacting monomers and is preferably employed in amounts such that between about 0.5 and 20.0, preferably between about 1.0 and 5.0 or 10.0 weight percent, of the monoolefinic aromatic compound is combined in the resulting copolymer.

The present invention also contemplates new and useful cements, including such rubbery isoolefin-multiolefin copolymers as described above, which have been modified by reaction with say aromatic sulfenyl and/or selenenyl halides in accordance with the invention. For instance, a single cement may be employed to bond butyl rubber to metal whereas double cements are preferably employed as tie gums to bond together unlike rubbery plastic, or elastic materials. These new double cements or tie gums are especially useful for bonding together layers or portions of natural rubber or other highly unsaturated synthetic rubbers to low unsaturation isoolefin-multiolefin interpolymers such as butyl rubber.

The foregoing cements are prepared by Friedel-Crafts catalysis of a $C_4$ to $C_8$ isoolefin, such as isobutylene with a $C_4$ to $C_{14}$ multiolefin at temperatures between about 0° and —200° C. The cement for application to the low unsaturation rubbery material is prepared from a feed composed of a $C_4$ to $C_7$ isoolefin and a $C_4$ to $C_{10}$ conjugated diolefin having a ratio of about 2 to 100 parts by weight of diolefin per 100 parts by weight of isoolefin. The unsaturation of the resulting copolymer generally corresponds to an iodine number of about 5 (Wijs) up to about 200, preferably about 20 to 150 (Wijs). The copolymer formed is then reacted with say an aromatic sulfenyl and/or selenenyl halide in accordance with the invention. The sulfenyl and/or selenenyl halide-modified copolymer is then emulsified in water to form a latex and/or is diluted with about 5 to 40% of a polymer solvent such as hexane, heptane, benzene, naphtha, straight run mineral spirits, mixtures thereof, etc.

The polymer in the cement for application to the highly unsaturated rubbery polymer is preferably copolymerized by Friedel-Crafts catalysis at temperatures of between about 0° and —200° C. from feed mixtures having about 100 to 800 parts by weight of a $C_4$ to $C_{10}$ multiolefin such as isoprene, allo-ocymene, cyclopentadiene, dimethylbutadiene, piperylene, dimethallyl, or even more especially, butadiene, per 100 parts by weight of a $C_4$ to $C_7$ isoolefin such as isobutylene and/or 2-methylbutene-1, 3-methylbutene-1, etc. The copolymer formed preferably has an unsaturation corresponding to an iodine number (Wijs) of at least about 50 up to about 300, preferably about 80 to 230. This polymer may then likewise be reacted with a sulfenyl halide and/or selenenyl halide, and solvated in any desirable solvent, with or without subsequent emulsification with water into a latex in a colloid mill or sonic mixer such as a Rapisonic homogenizer, etc. Each of the foregoing cements also preferably contain, per 100 parts by weight of copolymer, about 0 to 30, advantageously about 3 to 20, parts by weight of zinc oxide, about 20 to 100 parts by weight of carbon black (or an admixture of carbon black with a hydrated silica such as Hi-Sil 2202), about 0 to 10, preferably about 0.5 to 5.0 parts by weight of sulfur, about 0 to 6, preferably about 0.5 to 3.0 parts by weight of an ultra accelerator such as tetramethyl thiuram disulfide (and/or tellurium diethyl dithiocarbamate) and alternatively with about 1 to 10 parts of a quinone dioxime such as p,p'-dibenzoquinone dioxime and/or p-quinone dioxime, together with a suitable oxidizing agent such as $PbO_2$, $Pb_3O_4$, 2,2'-dibenzothiazyl disulfide, etc. The double cements may have a different number of different types of fillers and vulcanization ingredients and may include minor proportions of phenolic aldehyde resins, hydrocarbon plasticizer oils, esters, tars, etc. without exceeding the scope of the invention. For use in tie-plies, the amount of sulfur and curatives such as accelerators is advantageously reduced or may even be eliminated.

In employing the foregoing double cements, in accordance with the invention, the cements are coated on the rubbery surfaces as hereinbefore mentioned, the cements then being permitted to partially dry at temperatures of between about 20° and 100° C. for times of between about 0.5 and 60 minutes. The two rubber surfaces thus coated with the respective cements are then placed face to face (vis-a-vis) with their cemented surfaces touching, compressed under a pressure in the range of between about 0 and 5000 p.s.i.g., preferably between about 30 and 2000 p.s.i.g. and vulcanized for about 5 to 200 minutes at temperatures between about 250° and 350° F. or 400° F. respectively.

When coating metal surfaces including sheet metal, wire, tubing, etc., the only cement applied is the cement normally coated on the low unsaturation rubber. This cement, as mentioned above, is normally prepared from a feed composed of about 2 to 100 parts by weight of a $C_4$ to $C_{14}$ diolefin and about 100 parts by weight of a $C_4$ to $C_7$ isoolefin; the copolymer product formed having been subsequently reacted with a sulfenyl and/or selenenyl halide in accordance with the present invention. This cement preferably contains curatives but may be likewise diluted with solvents and/or extended with fillers, tackifiers and viscous oils. Alternatively, the copolymer, without an added solvent, may be calendered in a hot viscous state directly on to the sheet of metal to be rubber-coated or the compounded rubber may be applied to the metal in the form of a latex or the metal surfaces may first be coated with a phenolic-aldehyde resin such as resorcinol-formaldehyde resin.

The details and the advantages of the invention will be better understood from a consideration of the following experimental data.

EXAMPLE I

A three liter three-way round bottom flask, fitted with a mechanical stirrer, reflux condenser, nitrogen inlet tube, and a water bath, was charged with 1589 grams of a chloroform solution of a commercial butyl rubber corresponding to GR–I–25 rubber, i.e. having an iodine number of 13.3. The chloroform solution contained 10 grams of polymer per 100 milliliters of chloroform; the solution being stirred at room temperature. To this solution was added 2.04 grams of 2-nitro-4-carboxybenzenesulfenyl chloride prepared in accordance with the method described on page 1151 et seq., volume 77 of the Journal of the American Chemical Society (1955 edition). After stirring for a period of 30 minutes, the sulfenyl halide dissolved, the solution being clear and yellow in color. This solution was then stirred at room temperature for two hours, refluxed at 62° C. for four hours and was then allowed to cool and stand overnight. The modified sulfenyl halide butyl rubber product formed was purified by multiple solution-precipitation employing chloroform as the solvent and acetone as the anti-solvent for three times. The product was then freed of residual solvents by heating in a vacuum oven at 24 inches of water vacuum, for 16 hours at 60° C. The resulting reaction product of the sulfenyl halide and butyl rubber was yellow in color, rubbery in nature, and contained 0.30 weight percent of combined sulfur.

One hundred parts by weight of the foregoing product were compounded into the following recipe:

| Component: | Parts by weight |
| --- | --- |
| Stearic acid | 0.5 |
| Carbon black (MPC) | 50.0 |

The above mixture was hot milled for ten minutes at 300° F. which rendered the same substantially uniform and homogeneous. To the hot milled stock were then added the following:

| Component: | Parts by weight |
| --- | --- |
| Zinc oxide | 5 |
| Sulfur | 2 |
| Tellurium diethyl dithiocarbamate | 1 |

The foregoing compounded stock was then cured for 60 minutes at 307° F., an unmodified butyl rubber control being compounded and cured in the same manner.

These two stocks were then compared, their physical inspections being as follows:

| Compounded Stock | Resistivity, ohm-cm. | Modulus at 300% Elong. | Tensile Strength (p.s.i.) | Elong., percent |
| --- | --- | --- | --- | --- |
| Unmodified Butyl Rubber | 3.01×10⁸ | 1,150 | 2,900 | 550 |
| Sulfenyl halide butyl rubber reaction product | 2.084×10¹⁴ | 2,050 | 3,200 | 500 |

The above data show that sulfenyl halide-modified butyl rubber in accordance with the present invention exhibits about one million times the resistivity of the unmodified butyl rubber. This renders the modified butyl rubber more desirable for electrical insulation, capable of better carbon black dispersion, and therefore permits larger amounts of carbon black to be dispersed therein. In addition, the sulfenyl halide-modified butyl rubber exhibited a combination of a high tensile strength (3200 p.s.i.) and a high modulus (2050 p.s.i. at 300% elongation compared to 1150 p.s.i. for unmodified butyl rubber under the same conditions). Furthermore, the vulcanizate of the sulfenyl halide-modified butyl rubber was not tacky and exhibited good recovery after creasing as well as a very good drape, i.e. good resiliency. Upon testing of the adhesion of the sulfenyl halide-modified butyl rubber to metal, the adhesion was three times that of the adhesion value obtained employing unmodified butyl rubber. The hysteresis properties of the modified butyl rubber were substantially the same as for natural rubber.

EXAMPLE II

A three liter three-way round bottom flask, fitted with a mechanical stirrer, reflux condenser, nitrogen inlet tube, and a water bath, was charged with 900 grams of a benzene solution of a commercial butyl rubber corresponding to GR–I–25 rubber, i.e. having an iodine number of 13.3. The benzene solution contained 10 grams of polymer per 100 milliliters of benzene; the solution being stirred at room temperature. To this solution was added 2.05 grams of a commercially available 2,4-dinitrobenzene sulfenyl chloride. After stirring for a period of 15 minutes, the sulfenyl halide dissolved, the solution being clear and yellow in color. This solution was then stirred at room temperature for two hours and allowed to stand overnight. The modified sulfenyl halide butyl rubber product formed was purified by multiple solution-precipitation employing n-hexane as the solvent and acetone as the anti-solvent for three times. The product was then freed of residual solvents by heating in a vacuum oven at 24 inches of water vacuum for 16 hours at 60° C. The resulting reaction product of the sulfenyl halide and butyl rubber was yellow in color and rubbery in nature.

One hundred parts by weight of the foregoing product were compounded into the following recipe:

| Component: | Parts by weight |
| --- | --- |
| Stearic acid | 1.0 |
| Carbon black (MPC) | 50.0 |

The above mixture was hot milled for ten minutes at 300° F. which rendered the same substantially uniform and homogeneous. To the hot milled stock were then added the following:

| Component: | Parts by weight |
| --- | --- |
| Zinc oxide | 5 |
| Sulfur | 2 |
| Tellurium diethyl dithiocarbamate | 1 |

The foregoing compounded stock was then cured for 60 minutes at 307° F., an unmodified butyl rubber control being compounded and cured in the same manner.

These two stocks were then compared, their physical inspections being as follows:

| Compounded Stock | Resistivity, ohm-cm. | Modulus at 300% Elong. | Tensile Strength (p.s.i.) | Elong., percent |
|---|---|---|---|---|
| Unmodified Butyl Rubber | $3.01 \times 10^8$ | 1,150 | 2,900 | 550 |
| Sulfenyl halide butyl rubber reaction product | $1.895 \times 10^{10}$ | 1,550 | 29,50 | 490 |

The above data show that the sulfenyl-halide modified butyl rubber produced in accordance with the invention exhibits improved resistivity and modulus compared to the unmodified butyl rubber. Also, the sulfenyl-halide-modified butyl rubber vulcanizate of the present invention was not tacky and had a good recovery after creasing. The sulfenyl halide modified butyl rubber also formed a strong adherent bond when coated on metal.

EXAMPLE III

One hundred grams of a commercial butyl rubber corresponding to GR-I-25 were dissolved in 1000 cc. of chloroform and reacted with 8.7 grams of 2-nitro-4-carboxy benzenesulfenyl chloride for 2 hours at room temperature (25° C.) and then for 4 hours at the reflux temperature of the solvent. The reaction mixture was allowed to cool to room temperature and then to stand overnight. The polymer formed was precipitated from solution by adding dropwise an equal volume of acetone to the agitated solution. This solution-precipitation operation was repeated twice, residual solvents being stripped out under a vacuum of 24 inches of water for a period of 16 hours at a temperature level of 60° C. The resulting product was clear, yellow colored and tough. This product did not dissolve in benzene but was completely soluble in chloroform. More particularly, when a few drops of chloroform (or acetone) were added to the benzene-sulfenyl halide-modified polymer mixture (2 g. polymer/20 ml. solvent) the polymer became soluble. Thus it is evident that the sulfenyl halide reaction with butyl rubber altered the solubility characteristics of the new modified product formed since ordinary butyl rubber is soluble in benzene as well as in chloroform. The sulfenyl halide-modified butyl rubber product was analyzed and found to contain 0.334 weight percent of combined nitrogen corresponding to 5.56 weight percent of combined 2-nitro-4-carboxybenzenesulfenyl chloride.

EXAMPLE IV

One hundred parts by weight of the product from Example III were compounded into the following recipe:

Component: Parts by weight
Sulfenyl halide-modified butyl rubber _____ 100
Carbon black (Kosmobile 66, i.e. MPC black) _ 50

The compounded stock was heated in a mold for 15 minutes at 307° F. under 50 p.s.i.g. pressure and then placed in a cold press for 60 minutes at 45° F. and under 1500 pounds' pressure. An unmodified control butyl rubber polymer was compounded and treated in the same manner. The following comparison of physical values were obtained:

| Polymer | Tensile Strength, p.s.i. | Elong., percent |
|---|---|---|
| Unmodified Butyl Rubber | 0 | Plastic. |
| Sulfenyl halide-modified butyl rubber | 1,200 | 700. |

The above data show that a vulcanizate having excellent tensile strength and elongation may be obtained by modifying isoolefin-multiolefin containing copolymers, particularly butyl rubber, with an aromatic sulfenyl halide followed by curing the same in the presence of a filler but in the absence of added curatives such as sulfur or accelerators; whereas the unmodified isoolefin-multiolefin containing butyl rubber copolymer did not vulcanize. The hysteresis properties of the product formed, vulcanized as above, were superior to natural rubber.

EXAMPLE V

Various samples of the sulfenyl halide-modified-butyl rubber product from Example III were compounded with carbon black and zinc oxide as follows:

Component: Parts by weight
Sulfenyl halide-modified butyl rubber _____ 100
Carbon black (Kosmobile 66, i.e. MPC black) _ 50
Zinc oxide _____ 10

The compounded stocks formed were cured for various periods of time with the following results:

| Property | Cure Time at 307° F. | | | |
|---|---|---|---|---|
| | 15' | 30' | 45' | 60' |
| Modulus (at 300% Elong.) | 1,610 | 2,375 | 2,420 | 2,500 |
| Tensile Strength (p.s.i.) | 1,710 | 2,450 | 2,775 | 2,700 |
| Elongation, percent | 350 | 340 | 380 | 380 |

Although the above compounding recipe is not believed to represent the optimum ratios of ingredients, the compounds tested did show that unusually high moduli and tensile strength values were obtained by curing sulfenyl halide-modified butyl rubber solely with a filler and a polyvalent metal oxide but in the absence of sulfur, accelerators or other curatives normally needed to vulcanize ordinary butyl rubber.

It has also been found that the sulfenyl halide-modified isoolefin-multiolefin containing polymers of the present invention may be cured by means of mono-amines, polyamines, glycols, diisocyanates, diisothiocyanates and other sole or complementary polyfunctional compounds such as dimethylol phenols, quinone dioximes, dinitroso aromatic hydrocarbons and the like.

EXAMPLE VI

Another sample of the sulfenyl halide-modified butyl rubber polymer of Example III was compared with a control and showed approximately 1.3 to 2.0 times the dynamic modulus for a very similar order of internal viscosity and less than about two-thirds to one-half the percent of relative damping value, as shown more fully hereinafter. Both the control and the sample of the product of Example III were compounded into the following recipe:

Component: Parts by weight
Polymer _____ 100
Carbon black (Kosmobile 66, i.e. MPC black) _ 50
Zinc oxide _____ 5
Sulfur _____ 2
Tellurium diethyl dithiocarbamate _____ 1
Mold release agent (i.e. stearic acid) _____ 1

The above compounded sulfur-vulcanizable rubbery stocks formed were then cured for 65 minutes at a vulcanization temperature level of 307° F. The following inspections were noted:

*Dynamic properties at 50° C.*

[Standard Yerziey oscillograph test]

| Sample | Internal Viscosity, $\eta f \times 10^{-6}$ (Poises×c.p.s.) | Dynamic Modulus, $k \times 10^{-7}$ (Dynes/cm.²) | Relative Damp., percent |
|---|---|---|---|
| Control | 3.144 | 7.701 | 28.08 |
| Example VI | 2.223 | 14.63 | 11.46 |

The rebound values were as follows:

*Goodyear-Healey rebound method*

[10° angle of fall at room temperature (25° C.)]

Sample: Percent rebound
Control _____ 28.2
Example VI _____ 44.3

By running hardness tests for both the control and Example IV, it was found that the Shore "A" hardness of the control sample was 50 while that of the sulfenyl-halide modified product (Example VI) was 64. The hysteresis properties shown are comparable to natural rubber. More particularly, the above data shows that sulfenyl halide-modified butyl rubber exhibits the very desirable ratios of about 1.3 to 2.0 times the dynamic modulus and about 2/3 to 1/2 times the relative damping compared to an unmodified butyl rubber vulcanizate. The data also show that sulfenyl halide-modified butyl rubber has considerably better rebound than ordinary butyl rubber (i.e. a ratio of 44.3 to 28.2) as well as an improved Shore hardness (i.e. a ratio of 64 to 50).

EXAMPLE VII

A 100 g. sample of an isobutylene-isoprene butyl rubber copolymer (GR-I-25) was dissolved in 1000 ml. of chloroform and the solution was treated with 30 g. of Hy-flo (which is a diatomaceous earth) for 30 minutes at 40° C. before it was filtered. The filtered polymer soluiton was charged to a 3 liter flask fitted with a stirrer, reflux condenser, nitrogen seal and a thermometer.

To the polymer solution was added 0.8 g. of methylsulfenyl chloride at room temperature. A reaction then ensued for four hours at room temperature with constant stirring. After standing overnight, the reaction product was isolated by a multiple solution-precipitation technique using benzene as the solvent and acetone as the antisolvent. Residual solvents were stripped from the product by heating for 16 hours at 60° C. under 180 mm. of mercury pressure.

The product showed 0.07 weight percent sulfur and 0.1% chlorine.

EXAMPLE VIII

Example VII was repeated except that 1.6 g. of methylsulfenyl chloride were used.

The product showed 0.14% sulfur and 0.1% chlorine.

EXAMPLE IX

Example VII was repeated except that 3.1 grams of methylsulfenyl chloride were used.

The product showed the presence of 0.24 weight percent of combined sulfur.

EXAMPLE X

Example VIII was repeated except that hexane was used as the solvent.

The product showed 0.05 weight percent combined sulfur.

EXAMPLE XI

The products obtained in Examples VII to X were compounded in parts by weight as follows: modified polymer, 100; MPC black 50; stearic acid, 1; ZnO, 5; S, 2; Tellurac (tellurium diethyl dithiocarbamate), 1. The compounded stocks were cured for 60' at 307° F. The vulcanizates showed the following properties compared to an unmodified butyl rubber control:

| Product | Modulus at 300% Elongation | Tensile Strength, p.s.i. | Elong., percent | Resistivity, ohm-cm. |
|---|---|---|---|---|
| Control | 1,250 | 2,780 | 517 | $1.85 \times 10^8$ |
| Example VII | 1,460 | 3,010 | 415 | $2.0 \times 10^8$ |
| Example VIII | 1,420 | 2,975 | 490 | $2.0 \times 10^8$ |
| Example IX | 1,380 | 3,125 | 520 | $3.0 \times 10^8$ |
| Example X | 1,400 | 3,070 | 520 | $1.52 \times 10^8$ |

The above data show that the sulfenyl halide modified products of the invention exhibit a combination of increased modulus, tensile strength and resistivity.

EXAMPLE XII

Example VII was repeated except that hexane was used as a solvent and ethylsulfenyl chloride (1.1 g.) as a modifier.

The modified product showed 0.02 weight percent of combined sulfur.

EXAMPLE XIII

Example XII was repeated except that 2.2 g. of ethylsulfenyl chloride were used.

The modified product contained 0.03 weight percent of sulfur.

EXAMPLE XIV

Example XII was repeated except that 4.4 g. of ethylsulfenyl chloride were used.

The reaction product showed 0.07 weight percent of combined sulfur.

EXAMPLE XV

The products of Examples XII through XIV were compounded and cured as described above in Example XI. The vulcanizates showed the following properties warranting the same general comments as for Examples VII to X.

| Product | Modulus at 300% Elongation | Tensile, p.s.i. | Elong., percent | Resistivity, ohm-cm. |
|---|---|---|---|---|
| Control | 1,250 | 2,780 | 517 | $1.85 \times 10^8$ |
| Example XII | 1,500 | 2,900 | 510 | $1.216 \times 10^8$ |
| Example XIII | 1,700 | 3,058 | 490 | $1.065 \times 10^8$ |
| Example XIV | 1,575 | 2,775 | 450 | $1.485 \times 10^8$ |

EXAMPLE XVI

Example XIII was repeated except 1.42 g. of tertiary butylsulfenyl chloride were used.

The product contained 0.02 weight percent of combined sulfur.

EXAMPLE XVII

Example XIII was repeated except 2.84 g. of tertiary butylsulfenyl chloride were used.

The product showed 0.04 weight percent of combined sulfur.

EXAMPLE XVIII

Example XIII was repeated except 5.68 of tertiary butylsulfenyl chloride were used.

The reaction product showed 0.06 weight percent of combined sulfur.

EXAMPLE XIX

The products from Examples XVI, XVII, and XVIII were compounded and cured as described in Example XI. The vulcanizates showed the following properties warranting the same general comments as for Examples VII to X.

| Product | Modulus at 300% Elongation | Tensile, p.s.i. | Elongation, percent | Resistivity, ohm-cm. |
|---|---|---|---|---|
| Control | 1,250 | 2,780 | 517 | $1.85 \times 10^8$ |
| Example XVI | 1,500 | 2,950 | 490 | $9.6 \times 10^7$ |
| Example XVII | 1,320 | 2,750 | 480 | $1.3 \times 10^8$ |
| Example XVIII | 1,480 | 2,800 | 480 | $1.1 \times 10^8$ |

EXAMPLE XX 100 g. of isobutylene-isoprene butyl (GR-I-25) was dissolved in 100 ml. of hexane, the solution treated with 30 g. of Hyflo for ½ hour at 40° C. and the so treated solution filtered. The polymer solution was charged to a 3 l. 3-way flask fitted with a mechanical stirrer, reflux condenser, nitrogen seal system and a thermometer. Alpha chloromethylsulfenyl chloride (1.81 grams) was added to the polymer solution at room temperature with constant stirring for four hours. After standing overnight the reaction product was isolated by a multiple solution-precipitation technique using benzene as the solvent and acetone as the anti-solvent. Residual solvents were stripped from the product by heating for 16 hours at 60° C. under 180 mm. Hg pressure.

The purified product showed 0.04 weight percent of combined sulfur.

EXAMPLE XXI

Example XX was repeated except that 2.17 g. of alpha chloromethylsulfenyl chloride were used.

The product showed the presence of 0.23 weight percent of combined sulfur.

EXAMPLE XXII

Example XX was repeated except that 4.35 g. of alpha chloromethylsulfenyl chloride were used. The product showed 0.15 weight percent of sulfur.

EXAMPLE XXIII

Example XX was repeated except that 1.5 g. of alpha chloroethylsulfenyl chloride were used.

The purified product showed 0.03 weight percent of sulfur.

EXAMPLE XXIV

Example XX was repeated except that 2.9 g. of alpha chloroethylsulfenyl chloride were used.

The product showed 0.05 weight percent of sulfur.

EXAMPLE XXV

The products from Examples XX through XXIV were compounded as follows: polymer, 100 parts; Kosmobile-S-66 (MPC black), 50 parts; S, 2 parts; Tellurac, 1 part. The compounded stocks were cured for 60' at 307° F. The vulcanizate properties are summarized below:

| Product | Modulus, 300% Elongation | Tensile Strength, p.s.i. | Elong., percent | Resistivity, ohm-cm. |
| --- | --- | --- | --- | --- |
| Control | 1,250 | 2,780 | 517 | $1.85 \times 10^8$ |
| Example XX | 1,575 | 3,037 | 510 | $3.21 \times 10^8$ |
| Example XXI | 1,800 | 3,091 | 480 | $9.906 \times 10^7$ |
| Example XXII | 1,710 | 2,930 | 450 | $4.889 \times 10^8$ |
| Example XXIII | 1,300 | 2,850 | 540 | $9.1 \times 10^7$ |
| Example XXIV | 1,650 | 3,000 | 475 | $1.1 \times 10^9$ |

The above data show that high modulus, high tensile vulcanizates are obtained by modifying butyl rubber with halogen substituted aliphatic sulfenyl halides.

One particular advantageous use for the sulfenyl-halide or selenyl-halide-modified butyl rubber compositions of the present invention is in pneumatic tires of either the inner tube containing variety or in tubeless type tires.

Referring now to Figure III of the drawings, there is shown a pneumatic tubeless tire which comprises a hollow toroidal type member which is substantially U-shaped in cross-section by virtue of an open portion which extends around the inner periphery of the member. In other words, the tire is of a tubeless type structure which has a cross-section in the form of an open-bellied body with spaced terminal portions to define a member generally resembling a horseshoe. The terminal portions constitute bead portions 11—11 of the tire inside of which are a plurality of bead wires adhesively embedded and molded in a rubber. The outer surface of the bead portion is advantageously formed into an air-sealing means to aid in adhesion to rim 12 when the tire is inflated. Typical air sealing means may comprise a layer of rubber disposed on the outer surfaces of the bead portions. This layer will generally vary in thickness between about 0.02 to 0.5 inch and comprise a vulcanized rubber or rubbers having a relatively low compression or permanent set. Alternatively, the outer surfaces of the bead portions may contain a plurality of ribs or, if these surfaces are smooth, the tire rim may be roughened (for example by sandblasting) and/or ribbed circumferentially or both circumferentially and radially in those areas where the outer surfaces of the tire bead portions contact the rim. In any of the foregoing types of sealing means, a gumbo, dope, or cement comprising a soft, tacky, rubbery composition may be applied to the outer surfaces of the bead portions and/or the tire rim prior to mounting the tire. In any case, the air-sealing means advantageously contain the modified copolymers in accordance with the invention; the particular structural details of the tire or rim surfaces not constituting a part of the present invention. The outer surface of the tire also includes tread area 13 and sidewalls 14. The open portion of the horseshoe shaped tire faces that portion of the inner circumference of the tire which is adjacent the said tread area 13 of the tire.

The remaining construction of the tire may vary according to conventional fabrication, but in general the tire is a multi-layered type of structure with an outer layer as above mentioned. The layer next adjacent the outer layer generally comprises a carcass 15 which includes a rubber which has incorporated therein a fabric composed of a plurality of cotton, rayon, steel or nylon cords, etc. The tire also includes an inner lining 16 advantageously made from rubber, e.g. a selenenyl or especially a sulfenyl-halide-modified butyl rubber which has been at least partially vulcanized for about 1 to 60 minutes or more at about 200° to 400° F. in accordance with the invention. This inner lining must be substantially impermeable to air. The above multi-layers, at least three in number, are conventionally bonded or otherwise adhered together, for example, by cementing and/or especially by vulcanizing according to the invention to form a tire of a unitary structure.

The compositions comprising butyl rubber reacted with sulfenyl or selenenyl halides of the present invention may be employed generally throughout the tire. For example, the inner lining 16 may comprise for instance an aromatic sulfenyl or selenenyl halide modified butyl rubber which has been vulcanized. Alternatively, the inner lining 16 may comprise ordinary butyl rubber which has been bonded to carcass 15 by an interposed tie ply of a sulfenyl or selenenyl halide-modified butyl rubber which has been vulcanized. Such an interposed tie ply facilitates the inclusion of highly unsaturated rubbers such as natural rubber, GR–S rubber, Buna–N rubber, mixtures thereof, etc., in the carcass.

The other layers of the tire, such as the intermediate carcass layer and/or the outer layer (including the tread area, the sidewall and the outer bead portions, etc.) may also comprise butyl rubber reacted with a selenenyl or especially sulfenyl halide which has been vulcanized in accordance with the invention. Vulcanization of the carcass, plies (if any), sidewalls, and tread area is advantageously accomplished by heating the same for about 3 to 60 minutes or more at about 250° to 400° F. The butyl rubber sulfenyl and/or selenenyl halide compositions of the present invention included in the tire also preferably contain certain bivalent metal oxides (especially zinc oxide) and/or sulfur, optionally a vulcanization ultra accelerator and/or a filler, with or without a resin-tackifier, etc.

The tubeless tire may also contain, in at least the tread area 13, an oil-extended high molecular weight (e.g. viscosity average molecular weight of about 900,000 to about 2,000,000) butyl rubber which has been bonded to a more highly unsaturated rubber (or rubbers) in carcass 15 by an interposed tie ply of butyl rubber reacted with a selenenyl or especially sulfenyl halide which has advantageously been vulcanized in the presence of sulfur, a bivalent metal oxide, and a filler, with or without a resin-tackifier.

The expression "layer" as employed in the claims is intended to include plies and liners as well as such layers as the carcass, sidewalls, tread area, etc.

The compositions containing the reaction product of butyl rubber with a sulfenyl and/or selenenyl halide in accordance with the present invention, may be employed for a wide variety of applications other than for tubeless or inner tube containing tires such as in electrical insulation, tire curing bags or bladders, inner tubes, car window channel strips, proofed goods, and other applications where butyl rubber has utility.

Resort may be had to modifications and variations without departing from the spirit of the invention or the scope of the appended claims.

What is claimed is:

1. A composition comprising the reaction product at a temperature level of between about −30° C. and +175° C. of a copolymer of about 85 to 99.5 weight percent of a $C_4$ to $C_8$ isoolefin and about 15 to 0.5 weight percent of a $C_4$ to $C_{14}$ multiolefin with a minor proportion of at least one non-metallic halide selected from the group consisting of organic selenenyl halides, organic sulfenyl halides, and mixtures thereof; said reaction product containing up to 1 mole of the combined non-metallic halide per mole of double bonds in the copolymer.

2. An article of manufacture comprising a metal coated with the composition of claim 1.

3. A tire containing in at least one layer thereof the composition of claim 1.

4. A composition comprising the reaction product at a temperature level of between about −30° C. and +175° C. of a copolymer of about 85 to 99.5 weight percent of a $C_4$ to $C_8$ isoolefin and about 15 to 0.5 weight percent of a $C_4$ to $C_{14}$ multiolefin with about 0.1X to X weight percent of at least one non-metallic halide selected from the group consisting of organic selenenyl halides, organic sulfenyl halides, and mixtures thereof; wherein:

$$X = \frac{U(L)}{(100-L)M_1 + L(M_2+U)} \times 100$$

and:

L = mole percent of the multiolefin in the polymer,
$M_1$ = molecular weight of the isoolefin,
$M_2$ = molecular weight of the multiolefin, and
U = molecular weight of the non-metallic halide:

said composition being vulcanizable in the substantial absence of added curatives.

5. Composition according to claim 4 in which the non-metallic halide consists essentially of an aromatic sulfenyl halide.

6. Composition according to claim 4 in which the non-metallic halide is 2-nitro-4-carboxybenzenesulfenyl halide.

7. Composition according to claim 4 in which the non-metallic halide is a carboxy nitrosobenzenesulfenyl halide.

8. Composition according to claim 4 in which the non-metallic halide is a naphthalenesulfenyl halide.

9. Composition according to claim 4 in which the non-metallic halide is a $C_1$ to $C_{20}$ alkyl sulfenyl halide.

10. Composition according to claim 4 in which the non-metallic halide is a $C_1$ to $C_{20}$ haloakylsulfenyl halide.

11. A tire containing at least in one layer thereof the composition of claim 4.

12. A sulfenyl halide modified butyl rubber tie ply composition comprising about 100 parts by weight of butyl rubber containing up to 1 mole of a combined sulfenyl halide per mole of double bonds in the rubber; about 0.5 to 30 parts by weight of a basic metal oxide; and about 5 to 100 parts by weight of a filler selected from the group consisting of a carbon black, a silica, and mixtures thereof, said butyl rubber consisting of a copolymer of about 85 to 99.5 weight percent of a $C_4$ to $C_8$ isoolefin and about 15 to 0.5 weight percent of a $C_4$ to $C_{14}$ multiolefin.

13. In a tire adapted for use without an inner tube, the combination which comprises an open-bellied body terminating in spaced bead portions having an inner lining of butyl rubber reacted so as to contain about 0.1 to 1.0 mole of a combined sulfenyl chloride per mole of double bonds in the polymer, air sealing means at said bead portions, and a tread area intermediate of said bead portions, 100 parts by weight of the sulfenyl chloride-butyl rubber composition having been at least partially vulcanized in the presence of about 5 to 100 parts by weight of a filler, and about 0.5 to 30 parts by weight of zinc oxide, the butyl rubber consisting of a copolymer of about 85 to 99.5 weight percent of a $C_4$ to $C_8$ isoolefin and about 15 to 0.5 weight percent of a $C_4$ to $C_{10}$ multiolefin.

14. In a tire adapted for use without an inner tube, the combination which comprises an open-bellied body terminating in spaced bead portions, an inner lining, air sealing means at said bead portions, and a tread area intermediate of said bead portions, the composition of at least said tread area comprising a major proportion of an oil-extended butyl rubber reacted with up to one mole of a combined sulfenyl halide per mole of double bonds in the butyl rubber polymer, said composition having been cured at a temperature level between about 250° and 400° F., said butyl rubber consisting of a copolymer of about 85 to 99.5 weight percent of a $C_4$ to $C_8$ isoolefin and about 15 to 0.5 weight percent of a $C_4$ to $C_{14}$ multiolefin.

15. A process which comprises reacting, at a temperature level between about 10° and 175° C., a copolymer of about 85 to 99.5 weight percent of a $C_4$ to $C_8$ isoolefin and about 15 to 0.5 weight percent of a $C_4$ to $C_{10}$ multiolefin with about 0.2 to 0.6 mole, per mole of double bonds in said copolymer, of an organic sulfenyl halide.

16. An article of manufacture comprising a metal coated with a composition produced by the process of claim 15.

17. A laminated structure containing in at least one layer thereof a composition produced by the process of claim 15.

18. In a process for manufacturing a tubeless tire including a carcass member, the combination which comprises at least partially vulcanizing to said carcass member a layer disposed interiorly thereof, which layer comprises a rubbery copolymer containing about 85 to 99.5 weight percent of an isoolefin and a minor proportion of a multiolefin which has been reacted with about 0.1 to 1.0 mole of an organic sulfenyl halide per mole of double bonds in the copolymer, and vulcanizing to said carcass member a copolymer containing-layer disposed exteriorly thereof; said last-named copolymer having been reacted with about 0.2 to 0.6 mole of an organic sulfenyl halide per mole of double bonds in said copolymer, said last-named copolymer containing about 85 to 99.5 weight percent of an isoolefin and a minor proportion of a multiolefin.

19. In a process of manufacturing a tire including a carcass member, the combination which comprises coating the surfaces of said carcass member with a composition comprising the reaction product at about −30° C. to +175° C. of an organic sulfenyl halide with a copolymer prepared by copolymerization at about 0° to −200° C. of a feed composed of about 100 to 800 parts by weight of a multiolefin and 100 parts by weight of an isoolefin, coating the surfaces of the layers to be joined to each side of said carcass member with a composition comprising the reaction product at about −30° C. to +175° C. of an organic sulfenyl halide with a copolymer prepared from by copolymerization at about 0° to −200° C. of a feed composed of about 2 to 100 parts by weight of a multiolefin and 100 parts by weight of an isoolefin, placing the respective layers with their coated surfaces touching the coated surfaces of the carcass member, compressing the composite formed, and vulcanizing the same at a temperature level between about 250° and 400° F. to produce a laminated tire structure of improved characteristics.

No references cited.